(12) United States Patent
Kondo et al.

(10) Patent No.: US 6,831,387 B2
(45) Date of Patent: Dec. 14, 2004

(54) ROTATING ELECTRICAL MACHINE WITH PERMANENT MAGNETS AND METHOD OF MAKING SAME

(75) Inventors: Hiroaki Kondo, Mori-machi (JP); Akira Suzuki, Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 510 days.

(21) Appl. No.: 09/790,959

(22) Filed: Feb. 22, 2001

(65) Prior Publication Data
US 2003/0132681 A1 Jul. 17, 2003

(30) Foreign Application Priority Data
Feb. 22, 2000 (JP) ........................................ 2000-044134

(51) Int. Cl.[7] .......................... H02K 1/17; H02K 15/03; H02K 23/04
(52) U.S. Cl. .................. 310/154.03; 310/217; 310/254; 310/154.05; 310/154.06; 310/154.07; 310/154.08
(58) Field of Search ....................... 310/154.01, 154.03, 310/154.05–154.07, 154, 217, 254; 29/596

(56) References Cited

U.S. PATENT DOCUMENTS

| 4,661,729 A | * | 4/1987 | Hames et al. .................. 310/13 |
| 4,918,830 A | * | 4/1990 | Aso ............................. 29/596 |
| 5,057,730 A | * | 10/1991 | Yoshida ........................ 310/91 |
| 5,201,111 A | * | 4/1993 | Prohaska ....................... 29/596 |
| 6,384,498 B1 | * | 5/2002 | Yamaguchi et al. .......... 310/81 |

FOREIGN PATENT DOCUMENTS

| JP | 58022566 A | * | 2/1983 | .......... H02K/23/04 |
| JP | 59222067 A | * | 12/1984 | .......... H02K/23/04 |
| JP | 2003189511 A | * | 7/2003 | ............ H02K/1/17 |

* cited by examiner

Primary Examiner—Tran Nguyen
Assistant Examiner—J. Aguirrechea
(74) Attorney, Agent, or Firm—Ernest A Beutler

(57) ABSTRACT

An improved rotating electrical machine having permanent magnets and method for attaching the magnets that permits the use of thin, high flux density materials. The magnets and their mounting plate have facing cylindrical surfaces that are spaced slightly apart and through which an adhesive is introduced by capillary action through a groove formed at one end of the permanent magnets for providing attachment without having excess adhesive that can protrude beyond the surface of the magnets.

18 Claims, 10 Drawing Sheets

ROTATING ELECTRICAL MACHINE WITH PERMANENT MAGNETS AND METHOD OF MAKING SAME

BACKGROUND OF INVENTION

This invention relates to a rotating electrical machine and more particularly to an improved method for securing the permanent magnets to the carrier thereof in such a machine.

In many types of rotating electrical machines, there are provided a plurality of circumferentially spaced permanent magnets that cooperate with coil windings so as to either effect rotation of an output shaft, if the machine is a motor, or to output an electrical current, if the machine is a generator. Frequently, though not always, these permanents magnets are formed on the stator or yoke of the machine. Regardless of whether the permanent magnets are fixed or rotate, there is a problem with the prior art method by which they have been assembled.

Generally the permanent magnets have been bonded with an adhesive to a circumferential surface of a carrier before the permanent magnet material has been magnetized. Then, the segments are magnetized to give alternating polarities utilizing a magnetizer.

It has been the practice to apply the permanent magnet material to the carrier by utilizing an adhesive between the magnetic material and the carrier surface. The adhesive is secured in place by applying pressure to the two members with the adhesive being applied to one or both of these surfaces to be joined.

Since gaps are left between the adjacent magnets, the adhesive tends to be forced out of the gap between the two members. This is generally not a problem when using ferromagnetic materials because they have considerable thickness. However, the use of said thick magnets has several disadvantages in that it increases the size of the machine and also decreases its efficiency.

It has therefore, been proposed to use high magnetic flux density materials such as neodymium-iron-boron materials and the like. By utilizing this type of material having a high flux density, the thickness of the permanent magnet can be considerably smaller to reduce the size of the motor and to increase its efficiency.

The advantage of the thinness of the material, however, presents a problem in connection with adhesive bonding. That is, it significantly increases the likelihood that the adhesive material may be forced outwardly from beyond the edges of the adjacent magnets and protrude beyond them. In such a case, the raised adhesive is likely to contact the coils with which the magnets cooperate or their armatures. When such contact occurs, there is a likelihood that the magnets may become separated and/or the magnets or the coils become damaged.

It Is, therefore, a principal object to this invention to provide an improved method and improved structure by which permanent magnets are mounted that permits the use of adhesive bonding and thin magnets without the likelihood that the adhesive will protrude beyond the magnet surfaces.

Also, it is a further object to this invention to provide an improved method for adhesively bonding permanent magnets to a carrier.

SUMMARY OF INVENTION

A first feature of the invention is adapted to be embodied in an electrical machine having permanent magnets. The machine is comprised of a carrier having a cylindrical surface portion and a plurality of permanent magnets each having a cylinder surface complimentary to and spaced at circumferentially spaced locations from the carrier cylindrical surface portion. At least one circumferential groove is formed in one of the carrier and the plurality of magnets contiguous to the cylindrical surface portion. An adhesive bonds the permanent magnets to the cylindrical surface portion of the carrier and is supplied from the circumferential groove to the area between the cylindrical surface portion of the carrier and the cylindrical surfaces of the permanent magnets.

Another feature of the invention is adapted to be embodied in a method of making the rotating electrical machine as set forth in the preceding paragraph wherein the cylindrical surfaces of the permanent magnets are held in spaced relationship to the carrier cylindrical surface portion and an adhesive is supplied to the circumferential groove and permitted to fill the area between the cylindrical surfaces of the permanent magnets and the cylindrical surface portion of the carrier.

DETAILED DESCRIPTION

Figure 1:
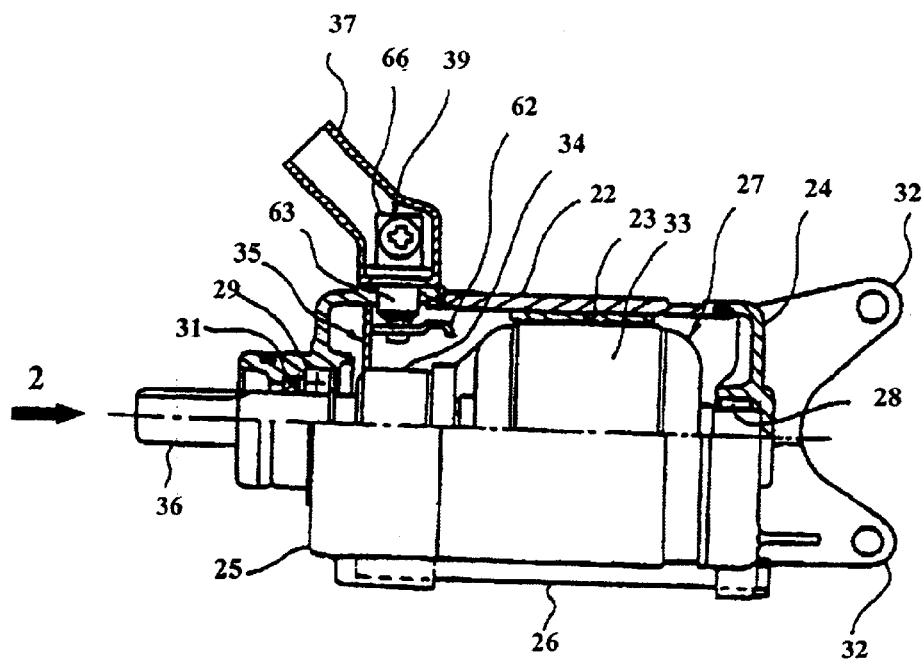
FIG. 1 is a side elevational view of a starter motor for an internal combustion engine constructed and made in accordance with a method embodying the invention, with a portion broken away so as to show the internal construction.
Figure 2:
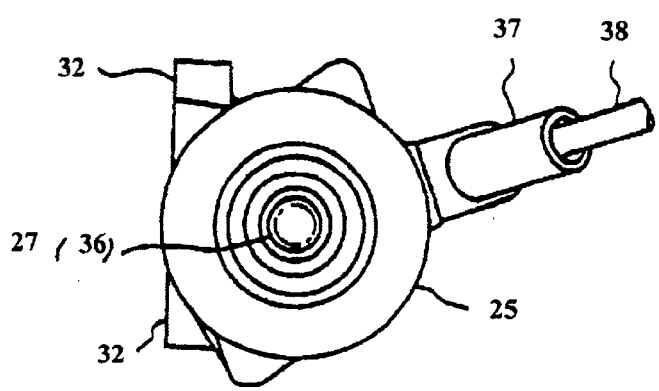
FIG. 2 is a front elevational view of the starter motor looking in the direction of the arrow 2 in FIG. 1.

Referring now in details to the drawings and initially primarily to FIGS. 1 and 2, a starter motor that is constructed and made by a method embodying the invention is indicated generally by the reference numeral 21. The starter motor is adapted to provide electrical starting of an associated internal combustion engine (not shown). Although the invention is described in conjunction with the starter motor, from the foregoing description, it should be apparent that the invention may also be utilized with other types of rotating electrical machines such as electrical generators or alternators.

The starter motor 21 includes a cylindrical housing 22 which also forms a magnet carrier, as will become apparent. To this end, permanent magnets 23 are affixed, in a manner to be described, in circumferentially spaced locations around a cylindrical inner surface portion of the outer housing 22. The permanent magnets are formed from a magnetic material having a high flux density such as neodymium-iron-boron.

The outer housing 22 is closed at opposite ends by means of end plates 24 and 25. The end plates 24 and 25 are fixed to the cylindrical housing 22 by means of a pair of elongated bolts or threaded fasteners 26, which are threaded into lugs formed on the end plate 25.

A rotor, indicated generally by the reference numeral 27 is journalled in the starter motor housing by means of bearings 28 and 29 carried by the end plates 24 and 25, respectively. An oil seal 31 is disposed adjacent the front bearing 29 while the rear bearing 28 is provided in a blind bore in the end plate 24.

The rear end plate 24 has a pair of lugs 32 that are formed with openings so as to receive fasteners for affixing it to the associated engine or body of the associated vehicle.

The rotor 27 is provided with a plurality of coil windings 33 that cooperate with the permanent magnets 23. Electrical current is fed to these windings by means of a commutator 34 that is fixed forwardly of the windings 33 and which cooperates with brushes, in a manner to be described, mounted on a brush holder 35 as is known in the art.

The front end plate 25 is provided with an electrical fitting 37 for passing an electrical cable 38 that supplies electrical current to the windings 33 of the rotor 27 through the brushes, as will be described. A terminal post 39 provides one of these electrical connections. The other connection is provided by grounding of the housing 32 to the vehicle body or engine, in a manner well known in this art.

Referring now additionally to FIGS. 3–8, the brush carrier construction 35 will be described in more detail. The brush holder 35 is comprised of an insulating plate 41 that is fixed to the end cover 25 by means of a pair of threaded fasteners 42, which are threaded into tapped openings formed in the end plate 25 to hold it in engagement with a pair of ribs 43. This provides a spaced relationship for the brush holder 35. Also, the brush holder 35 has a central opening 44 through which the commutator 34 partially extends.

Figure 8:
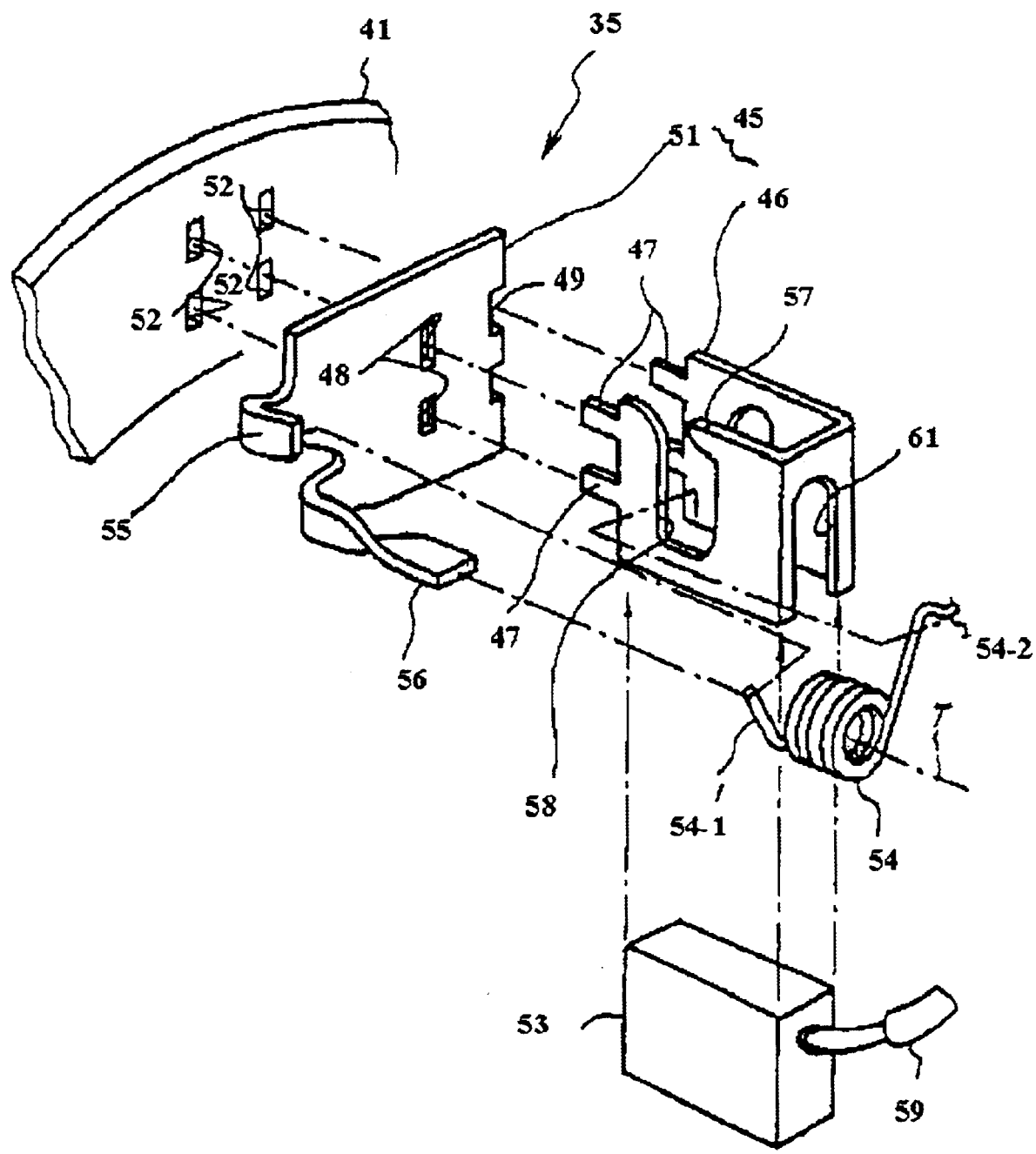
FIG. 8 is a partial exploded perspective view showing the construction details of one of the brush holders and its mounting to the carrier therefore.

Affixed to this insulating plate 41 are pluralities of brush boxes 45. These brush boxes 45 are formed, as best seen in FIG. 8. The brush boxes 45 are comprised of U-shaped metal plates 46 having a pair of parallel sides each of which has projecting tabs 47. The tabs 47 extend through openings 48 and slots 49 formed in a metallic base plate 51 of the brush boxes 45. In turn, these tabs extend into complimentary slots 52 formed in the insulating plate 41 and are affixed thereto in a suitable manner. For example, this attachment may be made by bending the ends of the tabs 47 over the side of the insulating plate 41 facing away from that engaged by the base plate 51.

The opening formed by the U-shaped sides of the plate 46 and the base plate 51 receives individual brushes 53 formed from carbon or any other suitable material. These brushes 53 are urged into contact with the commutator 34 by means of torsional type spring, indicated generally by the reference numeral 54.

These torsional springs 54 have a first end 54-1 that is adapted to engage a retaining lug 55 formed on the base plate 51 with the coils of the spring 54 being received around a post 56 formed thereupon. The post 56 is twisted as seen in FIG. 8 so as to provide a effective cylindrical surface around which the coil spring 54 may be positioned so as that the spring end 54-2 provides a torsional bias about its axis T to the brushes 53 that urges them in an axial direction relative to the axis of the rotor 27. A further arm 54-2 at the other end of the coil springs 54 is adapted to be engaged with the upper surface of the brushes 53 when the assembly is completed.

During the making of the assembly, however, these spring ends 54-2 are retained on retainer lugs 57 formed on one side of a slot 58 on one leg of the U-shape members 46. This is done so as to facilitate assembly, as will become apparent shortly.

Individual conductors 59 are affixed to each brush 53 and pass through clearance grooves 61 formed in the cross leg of the U-shaped members 46.

Figure 3:
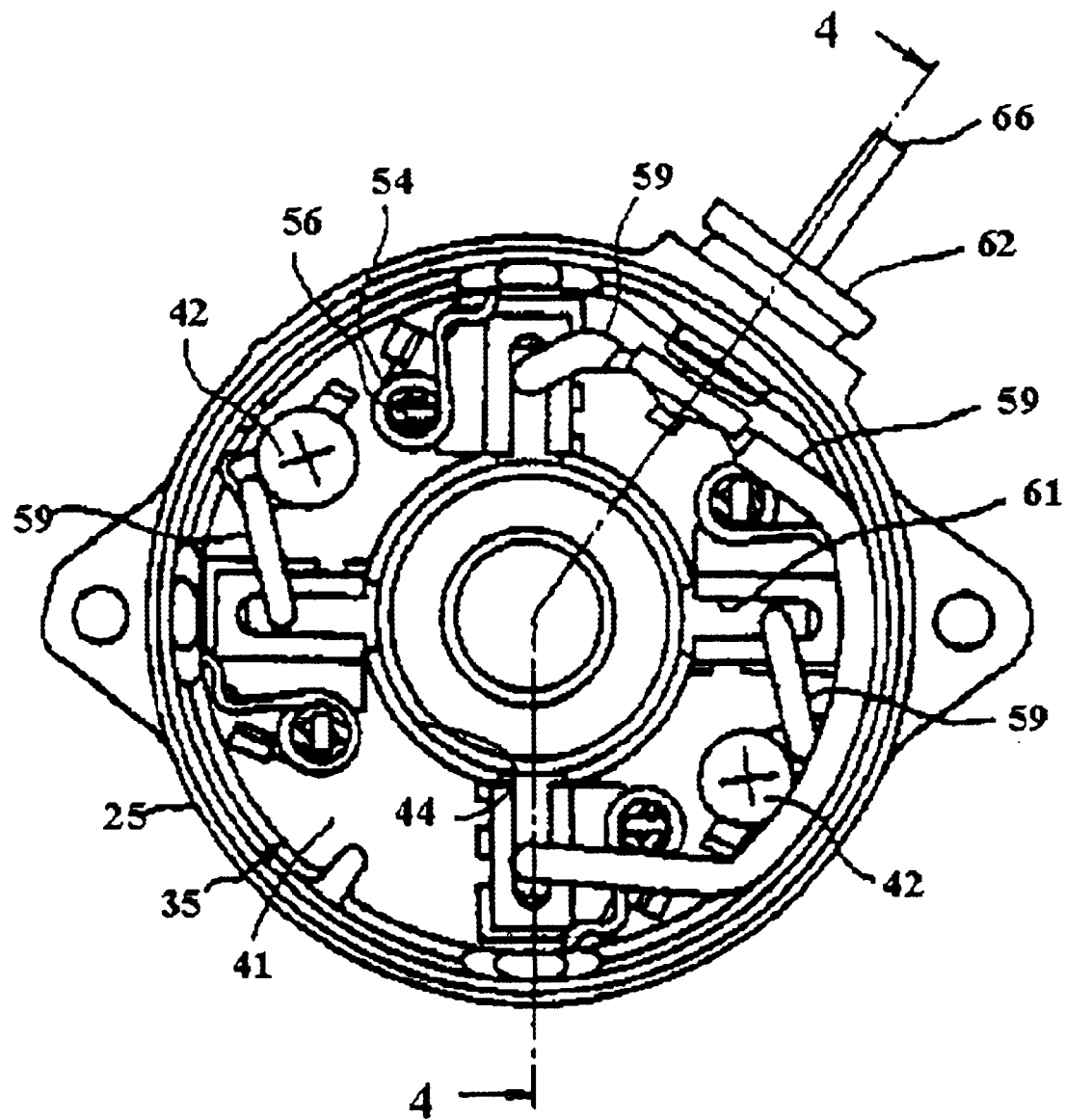
FIG. 3 is a view showing the brush mounting arrangement and is taken generally along a plane perpendicular to FIG. 1 and in the opposite direction from FIG. 2.
Figure 4:
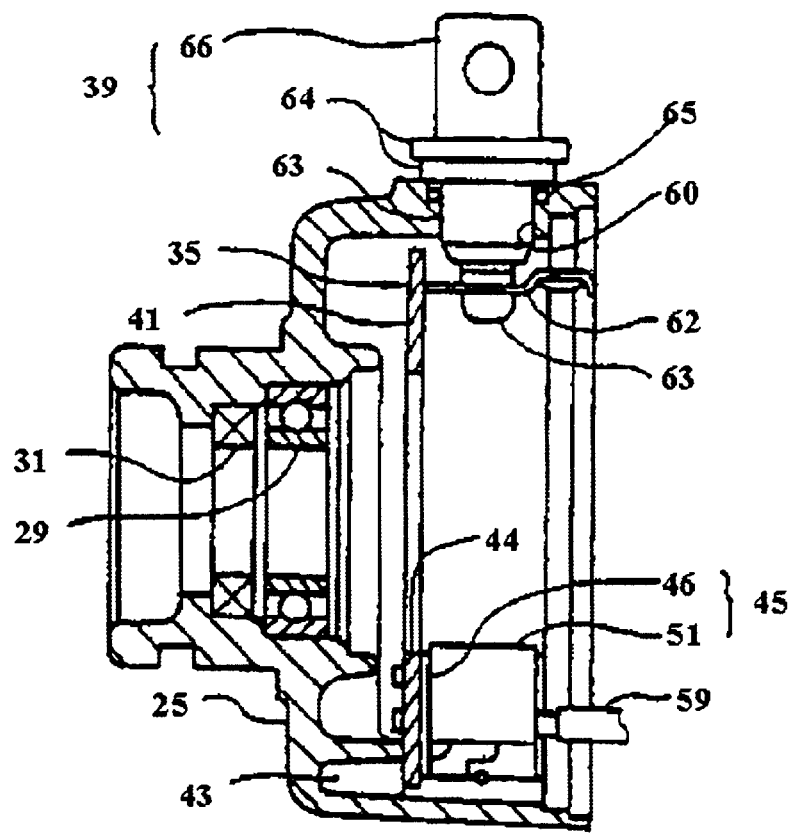
FIG. 4 is an enlarged cross sectional view showing the structure illustrated in FIG. 3 and is taken along the line 4—4 of that figure.
Figure 5:
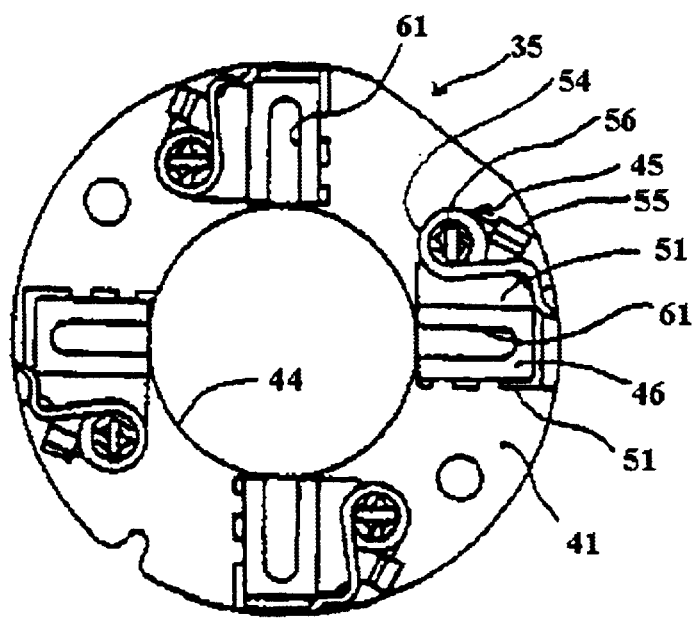
FIG. 5 is a view looking in the same direction as FIG. 3 but showing only the brush holder without the brushes in position and during an interim stage of the assembly process.
Figure 6:
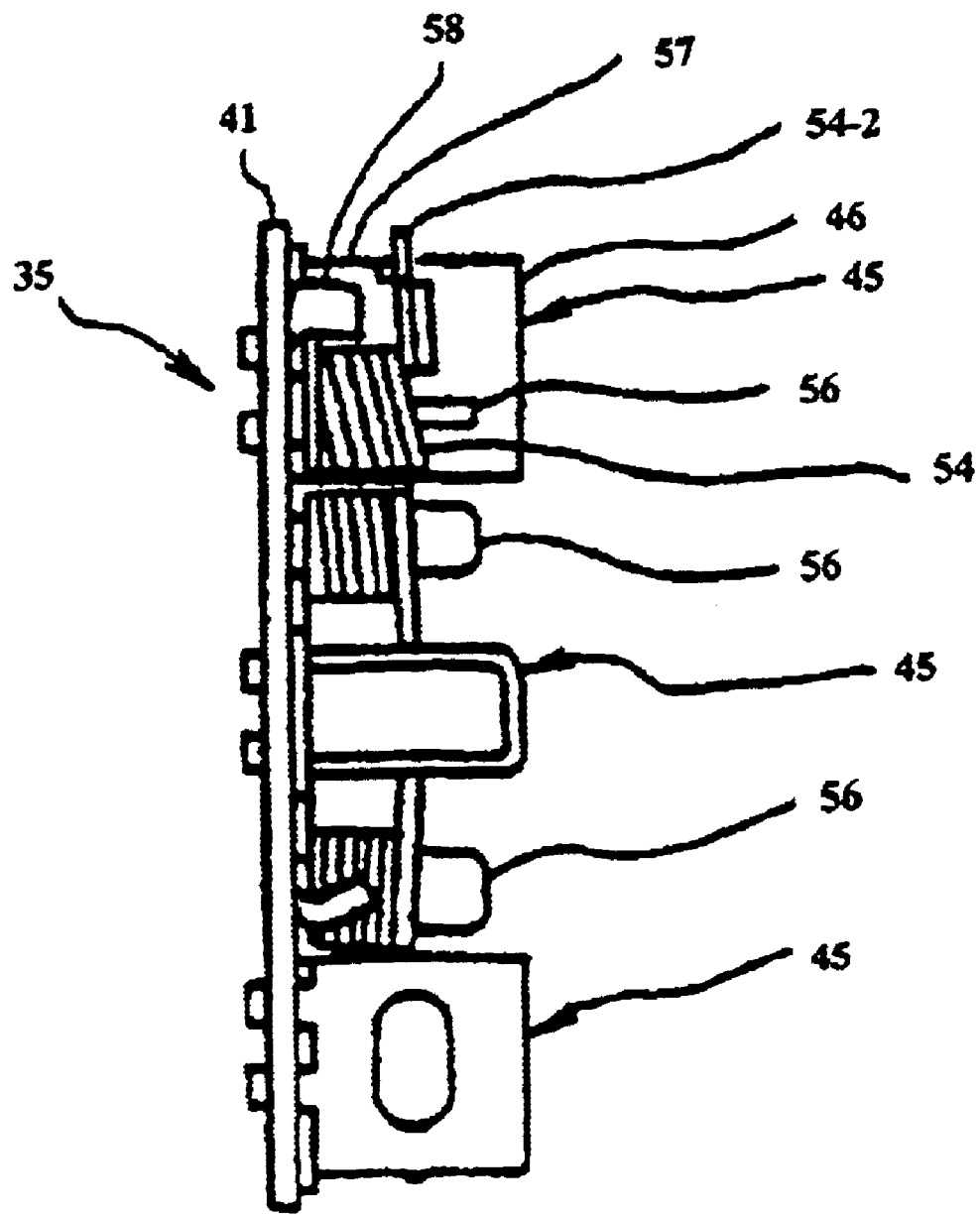
FIG. 6 is an enlarged side elevational view of the brush holder in the interim condition shown in FIG. 5.
Figure 7:
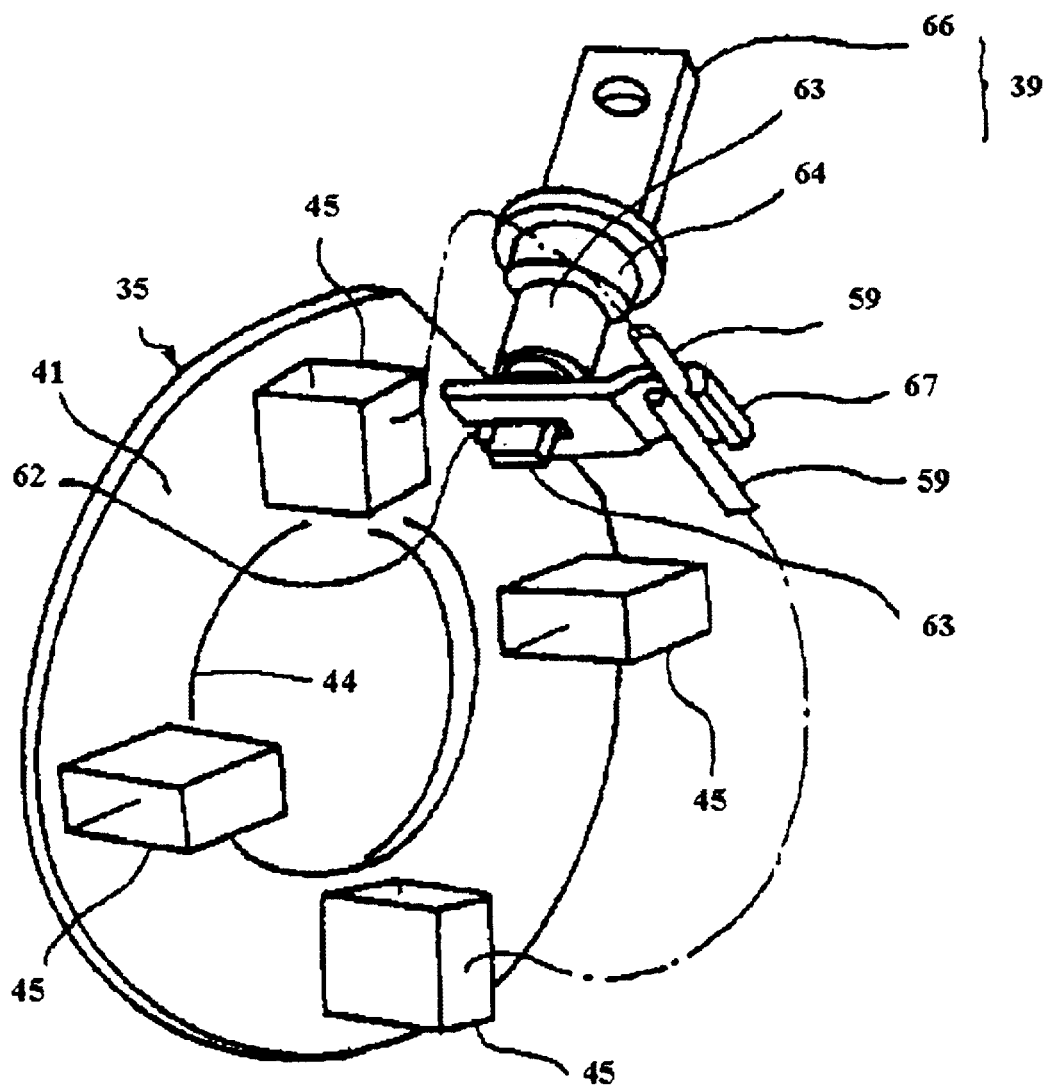
FIG. 7 is a partially schematic perspective view showing the brush holder assembly and the electrical terminal connection thereto.

As may be best seen in FIG. 3, the two diametrically opposed brushes 53 are grounded to the housing assembly by having their conductors 59 grounded to the attaching screws 42 that affix the insulating plate 51 to the housing assembly. The other two conductors 59 from the remaining diametrically opposed brushes 53 are connected to the terminal 39 by a structure that appears best in FIGS. 3 and 7.

This structure includes a conducting plate 62 that is affixed in a suitable manner, examples of which will be described later to the insulating plate 41. This conducting plate 62 has a slotted opening that receives a conducting tip 63 of the terminal 39. Preferably the slot that receives the terminal end 63 in the conducting plate 62 is slightly greater than the width of the conducting tip 63. The connection between the conducting tip 63 and the conducting plate 62 is made more electrically secure by soldering.

The terminal 39 also has an insulating block that is comprised of a press fitting portion 63 that is press fit into an opening 60 in the front end plate 25 and a shoulder portion 64 that is engaged with the outer surface of the end plate 25 and within the electrical connector 37. As may be seen in FIG. 4, an O-ring seal 65 provides a water tight connection in this area.

The upper end of the conductor 63 has a tab portion 66 to which a suitable electrical connector is fastened so as to provide electrical power to the brushes in the brush boxes 45. The ends of the connectors 59 associated with these brush boxes and the brushes 53 are soldered to an electrical connecting portion 67 of the conducting plate 62.

The manner in which the permanent magnets 23 are affixed to the carrier or cylindrical shell 22 will now be described by reference to FIGS. 9 through 12, with FIGS. 9 through 11 constituting a first embodiment of the invention and FIG. 12 constituting a second embodiment of the invention.

It will be seen that the cylindrical shell 22 is formed with a cylindrical surface portion 69, which is defined at its ends by a pair of circumferential grooves 71 and 72. As may be seen in FIG. 9, the grooves 71 and 72 are, in a preferred embodiment, arranged so that the axial length of the magnets 23 is such that their lower ends 23L are spaced above the lowermost groove 72 when mounted in a vertical position. The upper ends 23U of the magnets 23, however, overlap the groove 71, this overlapping being approximately 1 mm as an example.

Also, the magnets 23 have their outer cylindrical surfaces 23-O disposed so as to be spaced a slight amount from the outer shell cylindrical surface portion 69 with the dimension of this clearance being such that it is related to the viscosity of the adhesive which will be used so that the adhesive can fill this gap by capillary action.

In one preferred method, the magnets 23 and outer shell 22 are placed in a fixture wherein the magnets are spaced apart both circumferentially from each other and radially from the shell surface 69 so that they can be temporarily affixed thereto by one of the instant setting adhesives that are well known. They may be held in a suitable jig during this temporary mounting. This is done before the magnets 23 are actually magnetized.

Figure 11:
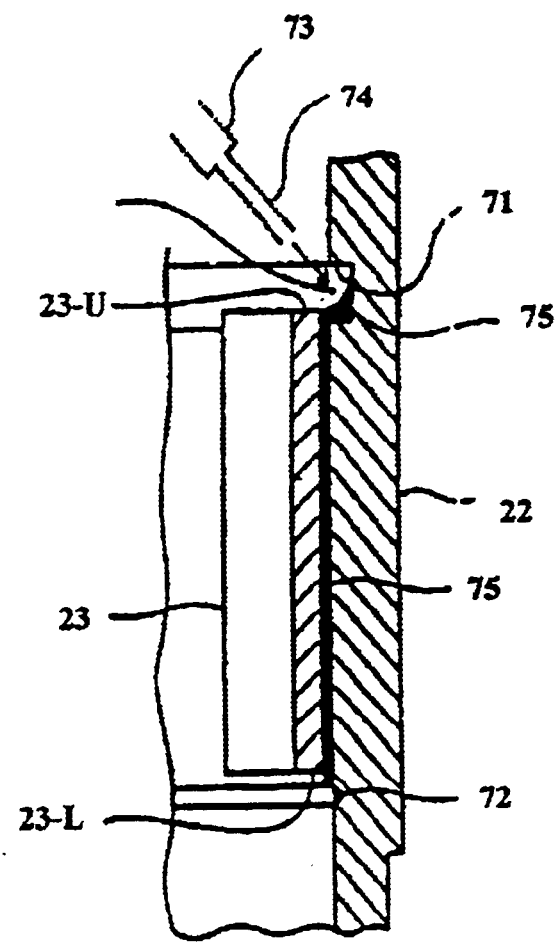
FIG. 11 is an enlarged cross sectional view showing one method by which the permanent magnets may be bonded to the carrier.
Figure 12:
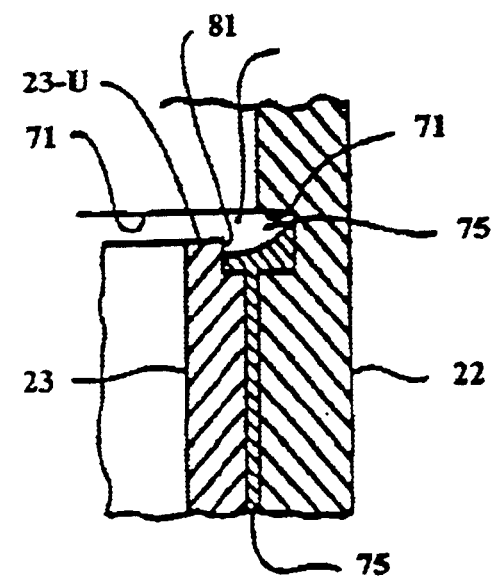
FIG. 12 is a partial cross sectional view, in part similar to FIG. 11, and shows another embodiment of the invention.

After this initial positioning and as seen in FIG. 11, an adhesive supply nozzle 73 having a tip portion 74 is inserted toward the upper end of the groove 71 and an adhesive, indicated by the reference numeral 75 is introduced. This is done while the magnets 23 are pressed against the carrier shell 22 by a suitable mechanism such as an inflatable bag.

The permanent adhesive will then flow by capillary action to the areas surrounding the instant setting glue and make a permanent bond. This capillary action may be improved by heating either or both of the adhesive and the shell 22. An epoxy resin may be used as the adhesive.

The lower groove 72 is designed so as to accumulate any excess adhesive and prevent it from extending outwardly beyond the lower end of the magnets 23 where it could contact the rotor 27.

Although this method describes the introduction of the permanent adhesive through the upper groove, it should also be understood that the device may be operated so as to operate in a fashion wherein the adhesive is inserted both the upper and lower grooves 71 and 72.

Figure 9:
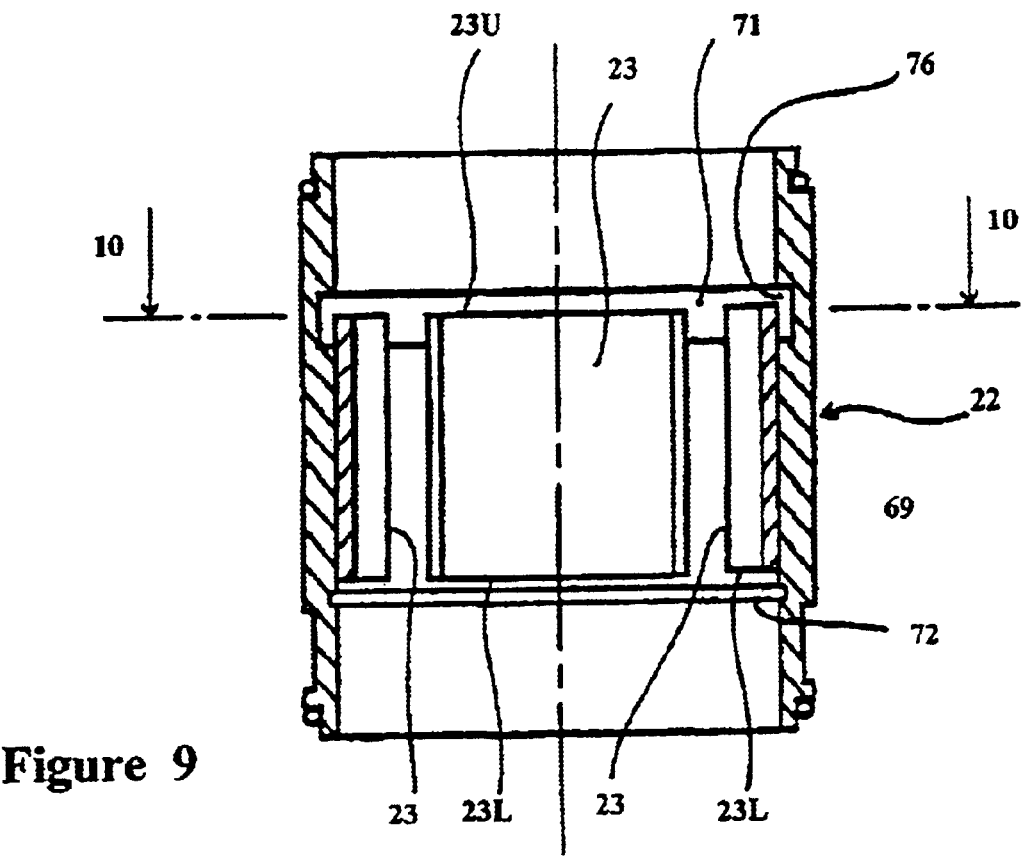
FIG. 9 is an enlarged cross sectional view taken through the carrier for the permanent magnets, which in this case constitutes the yoke or stator of the electrical motor.
Figure 10:
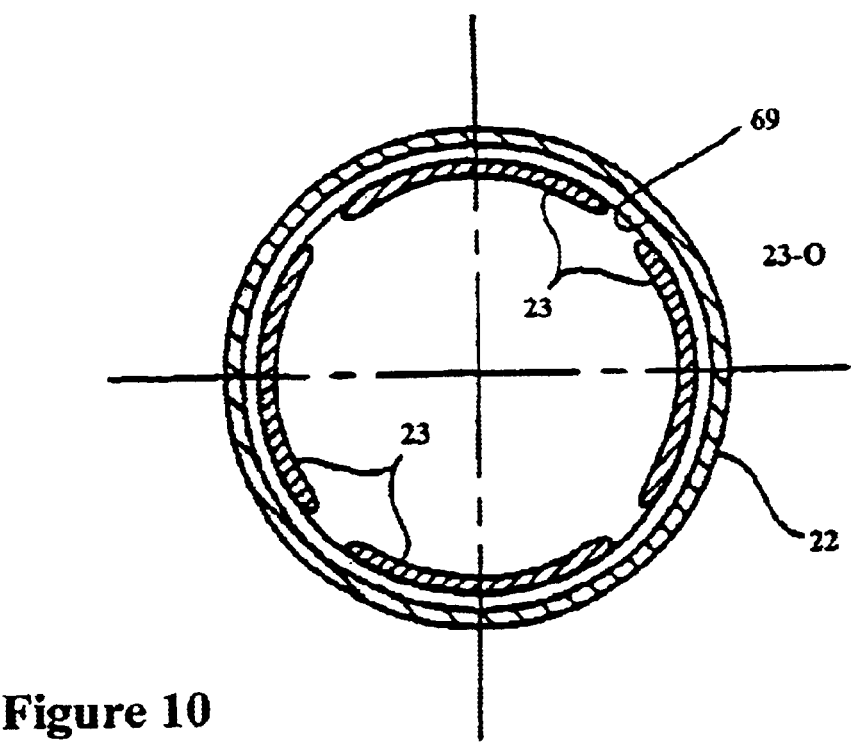
FIG. 10 is a cross sectional view taken along the line 10 10 of FIG. 9.

In the embodiments as thus far described, the clearance area indicated at 76 in FIG. 9 provided by the upper groove 71 and the permanent magnets 23 has been formed primarily by the groove 71 in the outer shell 22. However, the groove 71 may also be provided in whole or in part by the upper ends of the permanent magnets and FIG. 12 shows an embodiment wherein it is formed in part by a further recess 81 formed at the upper end of the permanent magnets. Again, a similar structure may be utilized at the opposite end and the permanent glue introduced from both ends.

After the magnets 23 are mounted, they are magnetized in a known manner.

It has been previously noted that the way in which the conductor plate 62 is affixed to the insulating plate 41 could be of any suitable type. In the arrangement show in FIG. 1, the slot that receives the terminal and 63 extends perpendicularly to the surface of the insulator plate 41 and hence it can be inserted around the terminal 39 when it is in position and then affixed suitably to the insulator plate 41. This can be done by having extending tabs that pass through openings in the backside of the insulator plate 41. These tabs then are folded over much in the same manner that the brush boxes 45 are attached. The soldering action then follows.

Figure 13:
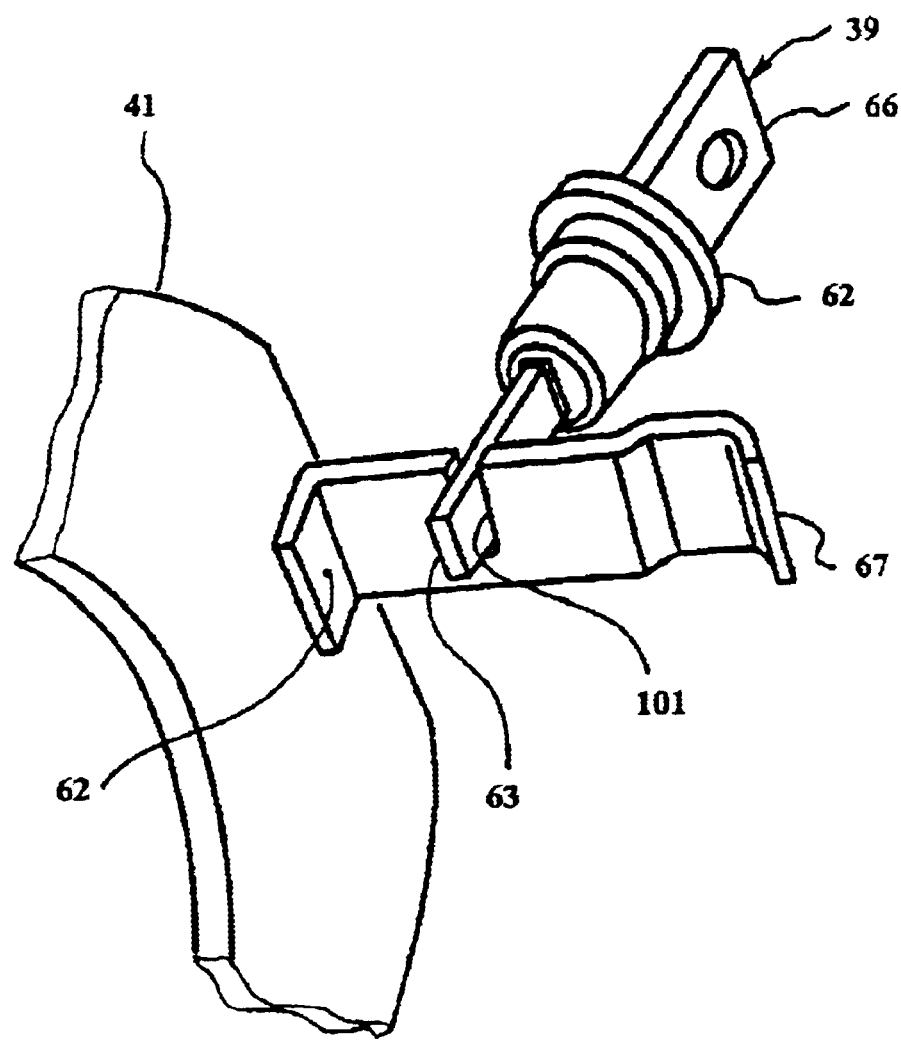
FIG. 13 is a partial, perspective view in part similar to FIG. 7 and shows a way in which the electrical terminal connection can be made.

FIG. 13 shows an alternative way that this can be done. In this figure, the conductor plate 62 is formed with a slot 101 that extends in a direction perpendicular to the axis of rotation of the rotor 27. Hence, the terminal end 63 of the terminal 39 is rotated so that the conductor 62 may be inserted around the terminal end in a circumferential direction and then affixed by an adhesive to the face of the insulating plate 41. The soldering action then follows.

Figure 14:
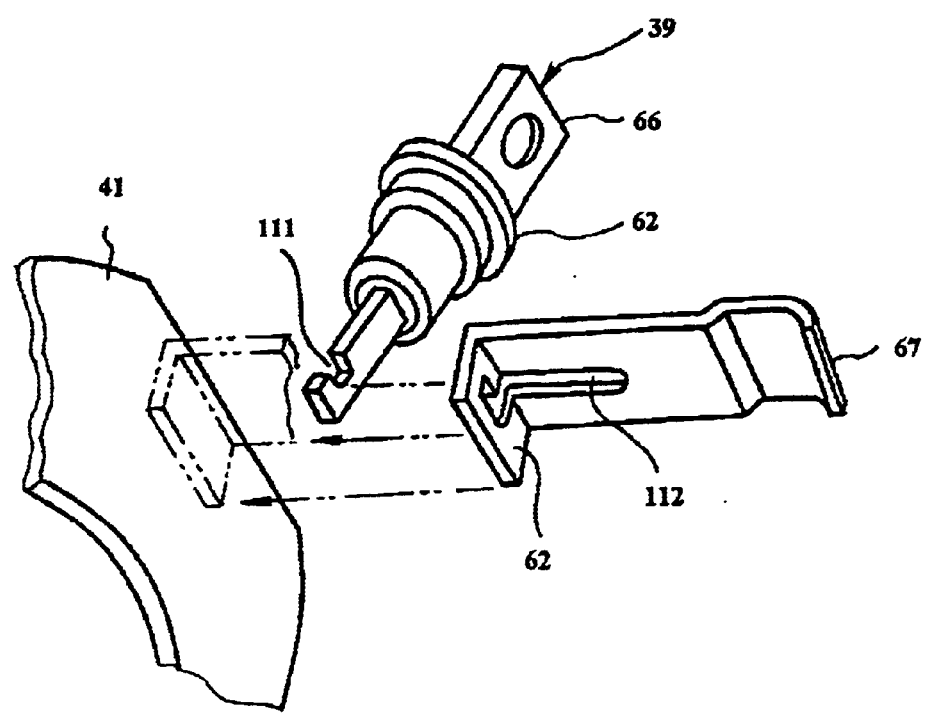
FIG. 14 is a partial, perspective view in part similar to FIG. 12 and shows another way in which the electrical terminal connection can be made.

FIG. 14 shows another way in which this attachment can be made utilizing a configuration somewhat as shown in FIG. 13 but wherein the conductor plate 62 may be inserted in an axial direction. In this instance, the terminal end 63 is formed with a slot 111 and the conductor plate 62 is formed with a key hole shape opening 112 that can be passed around the end of the terminal 39 when it is in place and then affixed, as by an adhesive, to the insulating plate 41. The soldering action then follows.

Thus, from the foregoing description it should be readily apparent that the described methodology permits the use of very thin, high flex density materials such as neodymium-iron-boron magnets which are adhesively bonded before being magnetized and then magnetized once affixed to the structure. Of course, other types of materials may be utilized without departing from the spirit and scope of the invention, as defined by the appended claims.

What is claimed is:

1. An electrical machine having permanent magnets, said machine being comprised of a carrier having a cylindrical surface portion, a plurality of permanent magnets having a cylindrical surface complimentary to and spaced at circumferentially spaced locations from said cylindrical surface portion, and at least one circumferential grove formed in one of said carrier and said plurality of permanent magnets contiguous to said cylindrical surface portion, and an adhesive bonding said permanent magnets to said cylindrical surface portion of said carrier and supplied from said circumferential groove to the area between said cylindrical surface portion of said carrier and said cylindrical surfaces of said permanent magnets.

2. An electrical machine as set forth in claim 1 wherein the permanent magnets extend in an axial direction across the circumferential groove.

3. An electrical machine as set forth in claim 2 wherein the circumferential groove extends in an axial direction beyond the permanent magnets.

4. An electrical machine as set forth in claim 3 wherein the permanent magnets overlap the circumferential groove by at least at least 1 mm.

5. An electrical machine as set forth in claim 4 wherein the adhesive comprises an instant adhesive at spaced locations between the cylindrical surfaces of the permanent magnets and the cylindrical surface portion of the carrier and a second adhesive material supplied around the instant adhesive by capillary action from the circumferential groove.

6. An electrical machine as set forth in claim 1 wherein the circumferential groove is formed at least in part by the carrier.

7. An electrical machine as set forth in claim 6 wherein the circumferential groove is also formed at least in part by the permanent magnets.

8. An electrical machine as set forth in claim 1 wherein the adhesive comprises an instant adhesive at spaced locations between the cylindrical surfaces of the permanent magnets and the cylindrical surface portion of the carrier and a second adhesive material supplied around the instant adhesive by capillary action from the circumferential groove.

9. An electrical machine as set forth in claim 1 wherein there is formed a further circumferential groove axially spaced from the first mentioned circumferential groove.

10. An electrical machine as set forth in claim 9 wherein the further circumferential groove axially is positioned contiguous to a second end of the permanent magnets and the first mentioned circumferential groove is contiguous to a first end of the permanent magnets.

11. An electrical machine as set forth in claim 10 wherein the first ends of the permanent magnets extends in an axial direction across the first mentioned circumferential groove.

12. An electrical machine as set forth in claim 11 wherein the first mentioned circumferential groove extends in an axial direction beyond the first ends of the permanent magnets.

13. An electrical machine as set forth in claim 12 wherein the second ends of the permanent magnets are axially spaced from the second circumferential groove.

14. An electrical machine as set forth in claim 1 wherein the permanent magnets are neodymium-iron-boron magnets.

15. A method of making an electrical machine comprised of a carrier having a cylindrical surface portion and carrying a plurality of permanent magnets a cylindrical surface complimentary to and spaced at circumferentially spaced locations from said cylindrical surface portion said method comprising the steps of holding the cylindrical surfaces of the permanent magnets in spaced relation to the carrier cylindrical surface portion and forming a circumferential groove in an area at one end of the area adjacent an axial end of the permanent magnets, and supplying an adhesive to the circumferential groove and permitted the adhesive to fill the area between said cylindrical surfaces of said permanent magnets and said cylindrical surface portion of said carrier by capillary action.

16. A method of making the electrical machine as set forth in claim 15 wherein the permanent magnets are temporarily set in position using an instant adhesive for preliminary positioning at spaced locations.

17. A method of making the electrical machine as set forth in claim 16 wherein the circumferential groove is positioned at the vertical upper ends of the permanent magnets when the adhesive is applied.

18. A method of making the electrical machine as set forth in claim 17 further including the step of forming a second circumferential groove located vertically below the lower edges of the permanent magnets for receiving and collecting any surplus adhesive supplied from the first mentioned circumferential groove.

* * * * *